US006980973B1

(12) United States Patent
Karpenko

(10) Patent No.: US 6,980,973 B1
(45) Date of Patent: Dec. 27, 2005

(54) SELF-PAYING SMART UTILITY METER AND PAYMENT SERVICE

(75) Inventor: Igor V. Karpenko, Mountain View, CA (US)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 09/390,937

(22) Filed: Sep. 7, 1999

(51) Int. Cl.$^7$ .............................................. G06F 17/00
(52) U.S. Cl. ..................................................... 705/412
(58) Field of Search ................................. 705/412, 413;
340/870.02, 5.41, 5.4, 5.42; 232/207; 283/58;
363/95; 73/861

(56) References Cited

U.S. PATENT DOCUMENTS

| | | | | |
|---|---|---|---|---|
| 4,351,028 A | * | 9/1982 | Peddie et al. ................ | 700/286 |
| 4,803,632 A | * | 2/1989 | Frew et al. .................. | 705/412 |
| 4,948,174 A | * | 8/1990 | Thompson et al. ........... | 283/58 |
| 5,146,067 A | * | 9/1992 | Sloan et al. ................. | 235/381 |
| 5,894,422 A | * | 4/1999 | Chasek .................. | 340/870.02 |
| 5,920,847 A | * | 7/1999 | Kolling et al. ................ | 705/40 |
| 6,049,791 A | * | 4/2000 | Lerner ........................ | 705/412 |
| 6,052,671 A | * | 4/2000 | Crooks et al. ............... | 705/412 |
| 6,133,850 A | * | 10/2000 | Moore .................... | 340/870.02 |
| 6,529,883 B1 | * | 3/2003 | Yee et al. ...................... | 705/63 |

FOREIGN PATENT DOCUMENTS

GB 2 313 462 * 11/1997

OTHER PUBLICATIONS

Grzanka, Len; Bringing interactivity to the bill; Public Utilities Fortnightly; 1994 n18; dialog copy pp. 1-6.*

* cited by examiner

*Primary Examiner*—Thomas A. Dixon
(74) *Attorney, Agent, or Firm*—Beyer Weaver & Thomas LLP

(57) ABSTRACT

A payment service enables a credit account or a debit account of a customer to be automatically billed for utility usage based on a reading that is automatically taken by an electronic utility meter. A method for processing information relating to usage of a utility includes receiving a utility reading that is a measure of the usage of the utility by a customer. The utility reading is received from a customer site across a first transmission medium. The method next determines an amount using the utility reading and transmitting the amount to a utility provider that is arranged to cause the amount to be paid. The amount is transmitted to the second remote location across a second transmission medium. The first transmission medium and the second transmission medium are each either a network communications line, a fiberoptic line, or a telephone line. The smart utility meter includes an electronic meter reader, a processor unit, a memory, a configuration interface, a network interface, and a power supply.

14 Claims, 8 Drawing Sheets

SELF-PAYING SMART UTILITY METER AND PAYMENT SERVICE

BACKGROUND OF THE INVENTION

1. Field of Invention

The present invention relates generally to a utility usage payment service. More particularly, the present invention relates to an automated utility usage payment service for monitoring utility usage and for automatically initiating a credit transaction or a debit transaction to pay for the utility usage.

2. Description of the Related Art

The use of utilities is an integral part of the lives of most individuals. That is, at most residences and businesses, utilities such as gas, water, and electricity are used, i.e., consumed. Each residence (or household) and business generally pays monthly bills for consumed utilities. A utility bill is typically generated by a utility provider after a "meter reader" manually records a utility reading from a meter located at a residence or a business. In some cases, a utility bill may be generated after an electronic meter reader provides a meter reading to the utility provider. Such electronic meter readings are typically transmitted to a receiving device that is carried by a meter reader who passes in proximity to meters on predetermined billing dates. The meter reader then returns the receiving device to the utility provider where readings received by the receiving device from electronic meter readings are processed. Electronic meter readers which are suitable for use in obtaining the amount of a utility that is consumed are described, for example, in U.S. Pat. Nos. 4,804,957 and 5,767,790, which are incorporated herein by reference in their entirety. Once a utility bill is received by a consumer, the consumer must pay the utility bill or risk losing service from the utility provider.

FIG. 1 is a diagrammatic representation of a conventional manual utility metering and payment system. A payment system 100 is arranged such that a person, i.e., a meter reader, visits a site 102 on the last day of a utility billing period in order to determine the amount of a utility that site 102 has consumed. Typically, the meter reader reads a meter 104 to gauge the amount of a utility which has been consumed at site 102, and relays the amount to the appropriate utility provider 108. For example, a meter reader who is working for a gas provider may read a meter 104a which tracks gas usage, a meter reader for an electricity provider may read a meter 104b which tracks electricity usage, and a meter reader for a water provider may read a meter 104c which tracks water usage. Alternatively, if meter 104 is associated with an electronic meter reader (not shown), then the electronic meter reader may electronically provide a meter reading to utility provider 108. Such an electronic meter reader may transmit a reading to a receiver device which is manually placed in proximity to the electronic meter reader by an individual when it is appropriate to obtain a reading.

Once utility provider 108 obtains a meter reading, utility provider 108 generates a bill 112 for utility consumption, and sends bill 112 to an appropriate customer, e.g., the responsible party for utility consumption at site 102. Once bill 112 is received by the appropriate customer, the customer then generally sends or delivers a check 116 to utility provider 108 in order to pay bill 112. It should be appreciated that in lieu of sending or delivering a check 116, a customer may also pay bill 112 using cash or a money order.

Upon receiving payment for bill 112, as for example in the form of check 116, utility provider 108 deposits check 116 at a bank 120. Utility provider 108 has an account 122 at bank 120, referred to herein as provider bank 120. Once utility provider 108 deposits check 116 at provider bank 120, provider bank 120 initiates a clearance and settlement process with a customer bank 126 on which check 116 is drawn. In other words, provider bank 120 and customer bank 126 (where the customer has an account 128) engage in a clearance and settlement process to ensure that utility payment funds from customer account 128 are effectively transferred to provider account 122.

As will be appreciated by those skilled in the art, clearance and settlement of a check is generally time-consuming and often expensive. Further, the process of obtaining meter readings relating to utility usage and generating corresponding bills is costly to the utility provider as the utility provider must typically provide personnel to obtain meter readings and to generate bills. Since substantially every residence and business must be billed monthly for utility usage, the costs associated with obtaining meter readings and generating bills are quite significant to utility providers. For example, the annual cost of manual reading of utility meters is approximately $2.6 billion to $3.45 billion in the United States of America.

For a utility customer the payment of monthly utility bills may be an inconvenience. In addition, for some customers with little income, paying monthly utility bills may be a significant burden, if not impossible. When utility bills are not paid in a timely manner utility providers may discontinue service until outstanding payments are made.

Therefore, what is needed is an efficient utility payment service. Specifically, what is desired is a utility payment system which enables readings from utility meters to automatically cause payment for a utility to be made from a customer account such as a credit account or a debit account.

SUMMARY OF THE INVENTION

The present invention relates to a utility metering system that enables a credit account or a debit account of a customer to be automatically billed for utility usage based on a reading that is automatically taken by an electronic utility meter. According to one aspect of the present invention, a method for processing information relating to usage of a utility includes receiving a utility reading that is a measure of the usage of the utility by a customer. The utility reading is received from a first remote location across a first transmission medium. The method also includes determining an amount using the utility reading and transmitting the amount to a second remote location that is arranged to cause the amount to be paid. The amount is transmitted to the second remote location across a second transmission medium. In one embodiment, the first transmission medium and the second transmission medium are each either a network communications line, a fiberoptic line, or a telephone line.

In another embodiment, transmitting the amount to the second remote location across a second transmission medium includes transmitting the amount across a global telecommunications network that performs clearance and settlement transactions. In such an embodiment, the method may further include generating a credit message using the amount such that transmitting the amount to the second remote location includes transmitting the credit message to the second remote location.

According to another aspect of the present invention, a method for providing information relating to usage of a utility from a utility meter to a processing center associated with the utility includes electronically obtaining a reading of utility usage from the utility meter. A utility message is generated using the reading, and transmitted across a transmission medium to the processing center. In one embodiment, the method includes configuring the utility meter by entering either credit account number or a debit account number into the utility meter.

In accordance with still another aspect of the present invention, an apparatus for monitoring the usage of a utility includes a processor-memory unit arranged to process and store information relating to the usage of the utility, a connection mechanism, and an electronic meter reader. The connection mechanism is coupled to the processor-memory unit and allows the processor-memory unit to communicate with a substantially remote receiving device. The electronic meter reader is also coupled to the processor-memory unit, and is arranged to electronically obtain meter counts associated the usage of the utility. In one embodiment, the processor-memory unit retrieves the meter counts from the electronic meter reader and generates a message including information associated with the meter counts.

According to yet another aspect of the present invention, a system for processing a utility usage transaction includes a utility metering mechanism arranged to generate a measure of usage of a utility, as well as a processing mechanism which receives the measure of the utility from the utility metering mechanism. The processing mechanism effects either a credit transaction or a debit transaction associated with the measure of the utility. The utility metering mechanism is further arranged to transmit the measure of the usage of the utility to the processing mechanism.

In one embodiment, the system includes a communications line that couples the utility metering mechanism to the processing mechanism. In such an embodiment, the utility metering mechanism may include a first modem, and may be coupled to the communications line through the first modem. The processing mechanism may also include a second modem, and may be coupled to the communications line through the second modem.

A system that allows utility payments to be made substantially automatically is convenient to both a utility customer and a utility provider. A substantially automatic utility payment system allows a credit account or a debit account of a customer to be automatically charged for utility payments. In some situations, the automatic charging of a credit account creates an automatic loan, e.g., for a customer who finds it difficult to pay for utility usage. Such a utility payment system also allows accurate readings to be taken, as the readings are generally taken with an electronic meter. In addition, the use of the utility payment system of the present invention may allow those customers who generate power, e.g., excess solar power, to automatically receive a credit for the power.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

Overall utility payment systems, i.e., systems which are implemented to generate utility bills and to provide for the payment of utility bills, are often time-consuming and expensive. From the point of view of a utility provider, time and expense are typically incurred during meter reading, billing, and clearance and settlement processes. From the point of view of a consumer of utilities, having to pay utility bills each month may be an inconvenience.

In an embodiment of the present invention, an automated utility payment system is arranged to automatically collect utility usage information, and to allow a customer's credit account or debit account to be directly charged for utility usage. Such a system, e.g., a self-paying "smart" utility metering and payment service, involves the automatic collection of readings from utility meters at a predetermined time, and the automatic generation of a credit transaction or a debit transaction using the readings from the utility meters. By eliminating the many manually implemented steps associated with utility payment systems, the efficiency of such systems may be increased, and the costs of such systems may be reduced.

Figure 1:
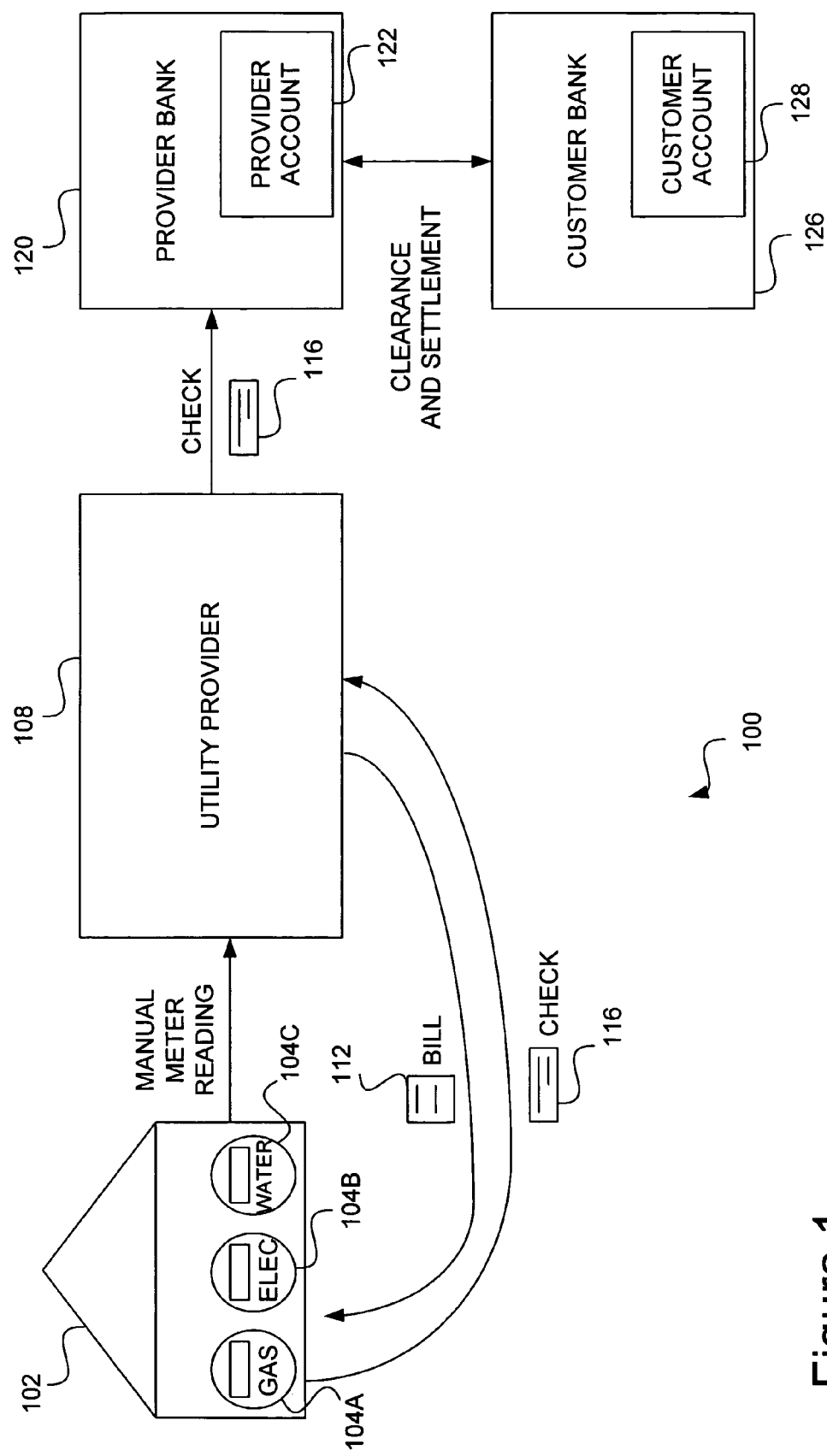
FIG. 1 is a diagrammatic representation of a conventional utility bill payment flow.
Figure 2:
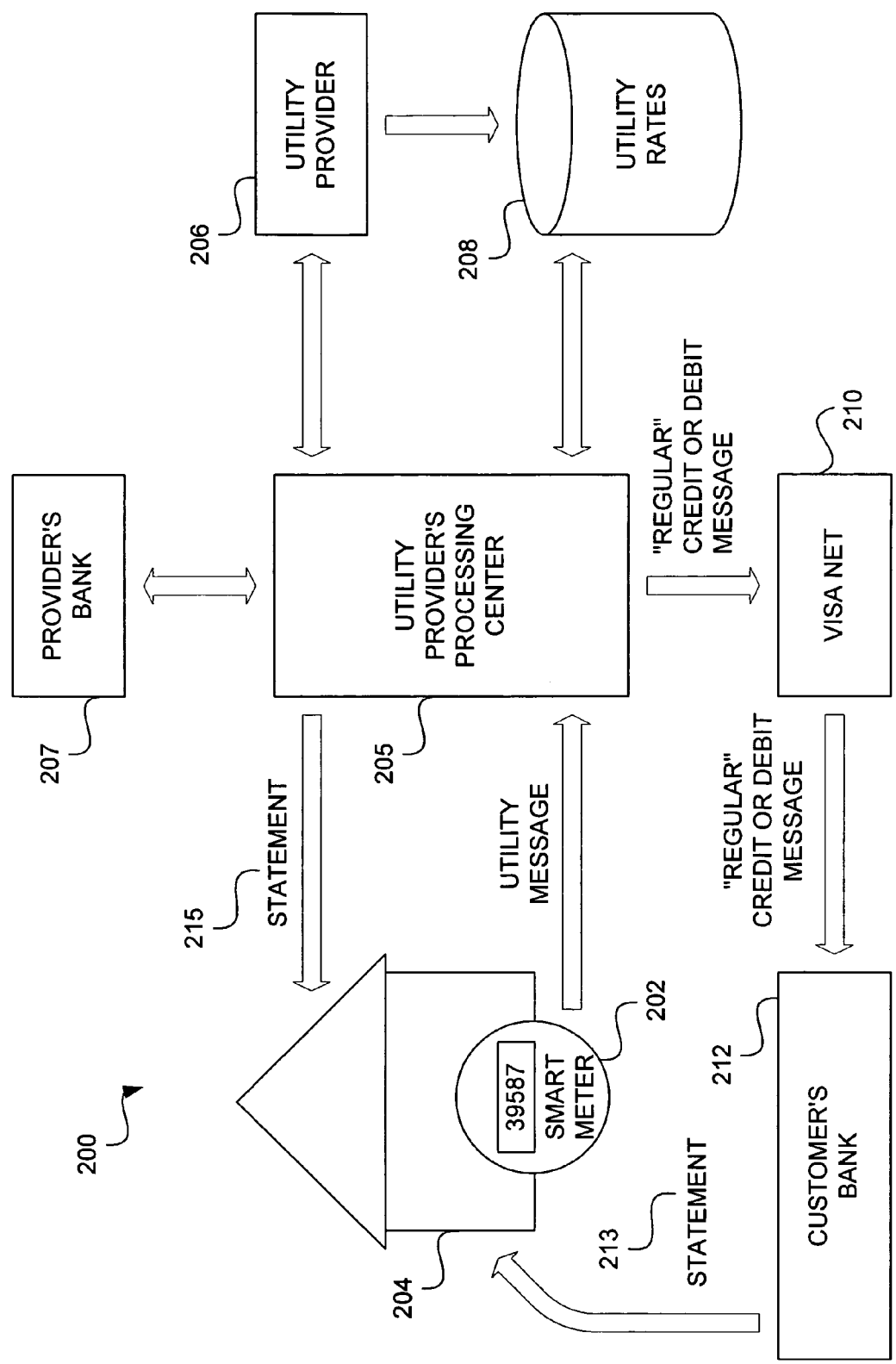
FIG. 2 is a diagrammatic representation of a self-paying smart utility metering and payment service flow in accordance with an embodiment of the present invention.

One example of a self-paying smart utility metering and payment service will be described with respect to FIG. 2. FIG. 2 is a diagrammatic representation of the process flow associated with a self-paying smart utility metering and payment service in accordance with an embodiment of the present invention. A payment service 200 includes a smart meter 202 which is located at a customer site 204, e.g., a residence or a business. Smart meter 202 is generally a utility metering system that measures consumed utility resources electronically, and may replace conventional meters typically used to measure the usage or consumption of utilities including, but not limited to, gas, electricity, and water. In the described embodiment, smart meter 202 is arranged to measure the consumption of one utility, although it should be appreciated that in other embodiments, smart meter 202 may be arranged to monitor multiple utilities.

Smart meter 202 may include an electronically-driven optical reading device that reads "wheels" on a mechanical metering component, such as one used to read a gas usage meter, an electricity usage meter, or a water usage meter. Alternatively, smart meter 202 may include a device that electronically maintains a count associated with utility usage using, for example, microprocessor-based circuitry and Hall effect electric current sensors. Examples of suitable meter reading devices for smart meters are described in above-referenced U.S. Pat. Nos. 4,804,957 and 5,767,790. The general components of smart meter 202 will be described below with respect to FIG. 3. It should be appreciated that other suitable meter reading devices may be used as well.

At the end of a billing period, e.g., at a specified time on a particular day of each month, smart meter 202 transmits utility information to the processing center 205 of a utility provider 206. The information may include, but is not limited to, a utility account number and a measure of the utility usage. In one embodiment, the information is transmitted in the form of a utility message, e.g., a International Standards Organization (ISO) formatted message, as will be discussed below with reference to FIG. 5.

Processing center 205, which may be a mainframe or a workstation, is arranged to receive and to process utility information for utility provider 206. Utility provider 206 may access a database 208 to obtain information relating to customers and rates for a utility at particular sites. As will be appreciated by those skilled in the art, rates for utility usage may vary depending upon the address at which the utility is being used. Once rate information, typically in units of currency per utility unit, is obtained, processing center 205 generates a standard ISO credit message or debit message for the utility usage. A standard ISO credit or debit message will be described below with respect to FIG. 4.

In general, the credit or debit message is sent to a global telecommunications network 210. Such a network is arranged to perform a comprehensive set of services such as credit authorizations, debit transactions, a single message service (SMS), automated clearing house (ACH) transactions, and clearance and settlement processes. Existing networks such as ATM networks, the Internet, or propriety networks may be used. Networks may enable communication via media that includes, but is not limited to, telephone lines, cables, fiber optics, microwaves, and satellites. In one embodiment, network 210 is implemented using VisaNet, an existing global clearing and settlement system provided by Visa International Service Association (Visa International) of Foster City, Calif.

Through network 210, a credit or debit message is sent to the customer's bank 212 (i.e., the bank of the party responsible for payment of utility consumption at site 204) once a credit or debit transaction, respectively, is authorized by network 210. In the described embodiment, bank 212 is the bank which issued the credit card or debit card which is to be used to pay for utility consumption. Bank 212 then includes a transaction message on a subsequent statement 213, e.g., credit card statement, that is sent to the party responsible for payment. Statement 213 is typically a record of transactions which were executed on behalf of a customer during a particular period of time.

Including payment for utility consumption in a monthly credit card statement, for example, eliminates the need for a customer to pay for utility consumption separately. In addition, including payment for utility consumption in a monthly credit card statement enables a customer to effectively delay full payment for the utility consumption. That is, a customer may make a minimum payment on the credit card, and, hence, essentially pay for utility usage on credit. At the same time, utility provider 206 receives full payment from bank 212 through network 210 and its bank 207, i.e., the provider bank, without undergoing a time-consuming clearance and settlement process with a customer's check.

In the described embodiment, utility provider 206 may issue a statement 215 to a customer associated with site 204 through processing center 205. Statement 215 may include information relating to the amount of utility consumption at site 204 during the last billing period, and is provided such that a customer may monitor utility consumption at site 204. Such a statement 215 may also include information which reminds a customer that his credit or debit account has automatically been charged for payment.

Figure 3:
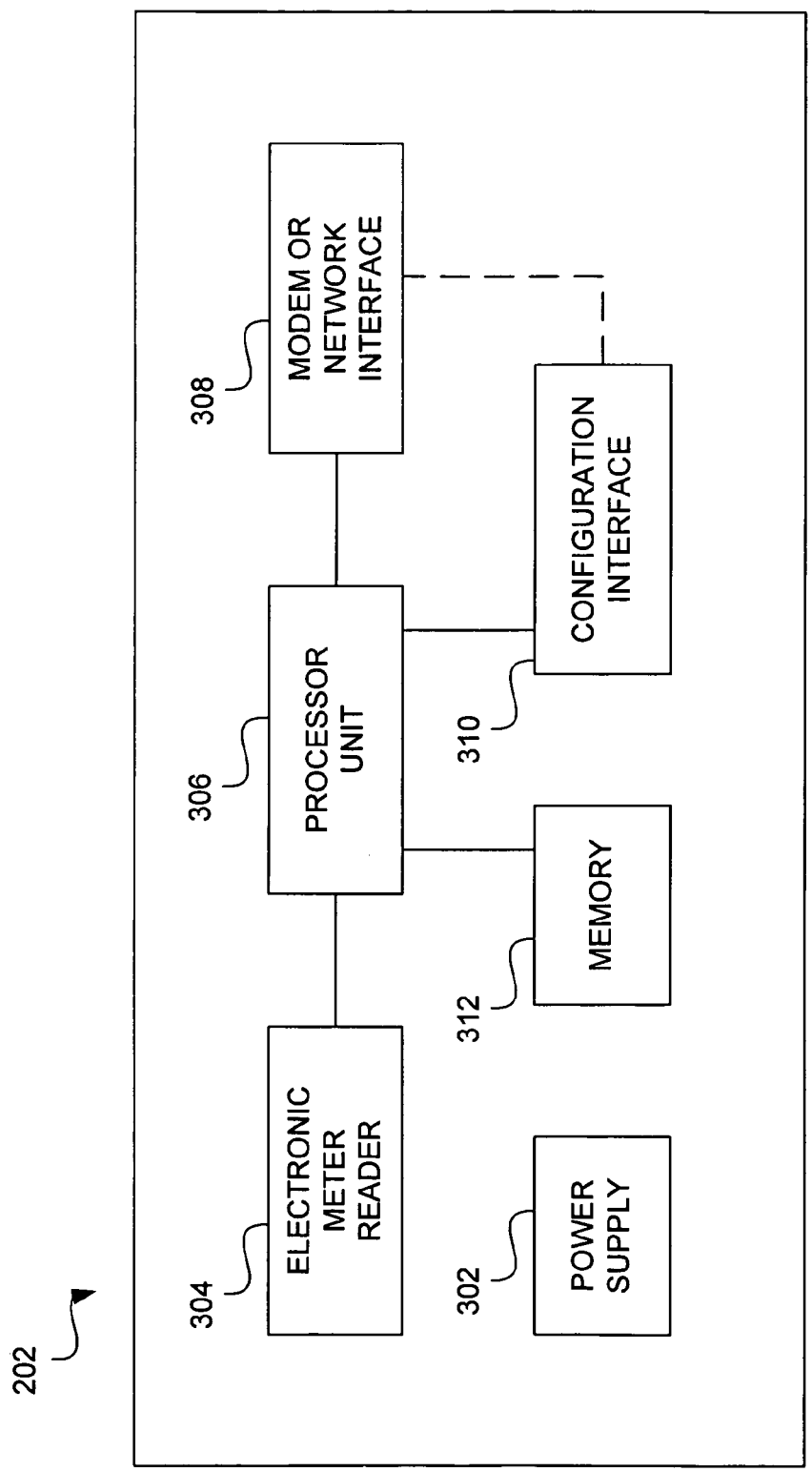
FIG. 3 is a diagrammatic block diagram representation of a self-paying utility meter in accordance with an embodiment of the present invention.

FIG. 3 is a diagrammatic representation of a smart meter, e.g., smart meter 202 of FIG. 2, which is suitable for use as a part of a self-paying utility metering and payment service in accordance with an embodiment of the present invention. Smart meter 202 includes a power supply 202. Power supply 202 is arranged to power the electronics of smart meter 202. While power supply 202 may be self-powering, as for example through the use of solar cells or batteries, power supply 202 is typically connected to a transformer at the site at which smart meter 202 is located.

Smart meter 202 includes an electronic meter reader 304 which is arranged to read or otherwise obtain levels of utility usage. As previously mentioned, while meter reader 304 may be a device which reads a mechanical metering interface, meter reader 304 may also be an integral part of an electronic meter. In the described embodiment, meter reader 304 produces and stores meter counts associated with utility usage.

Electric meter reader 304 is coupled to a processor unit 306, which may be a microprocessor. Processor unit 306 retrieves meter counts from meter reader 304 when it is desired for a meter reading to be obtained, e.g., when it is the end of a billing period. Processor unit 306 is effectively the computational center of smart meter 202, and is arranged to generate a utility message which includes such information as an amount of utility usage, as will be discussed below with respect to FIG. 5. While the technology used to computationally power processor unit 306 may be widely varied, in one embodiment, the technology is the Java Jini™ technology, developed by Sun Microsystems, Inc. of Palo Alto, Calif.

Processor unit 306 is coupled to a modem or network interface 308. Modem or network interface 308 is arranged to communicate with a processing center of a utility provider, e.g., processing center 205 of FIG. 2, through a telephone line or an ISDN line, for example. Using modem or network interface 308, processor unit 306 may send information such as a utility ISO message to a processing center. Processor unit 306 may also receive information, such as a request for a utility meter reading, from a processing center.

Processor unit 306 is coupled to a configuration interface 310 which allows smart meter 202 to be configured. The steps associated with configuring smart meter 202 will be described below with reference to FIG. 6. Configuration interface 310 may allow information such as the name of a customer, the address at which smart meter 202 is located, and an account number to which utility usage is to be charged, to be input into smart meter 202. In one embodiment, configuration interface 310 is arranged such that a computer, e.g., a laptop or notebook computer, may be connected to configuration interface 310 using a serial cable in order to input information into smart meter 202. Alternatively, in another embodiment, configuration interface 310 is arranged to accept information provided from a remote location through modem or network interface 308.

A memory 212 which is coupled to processor unit 306 and, hence, configuration interface 310 is arranged to store information that is inputted to smart meter 202 through configuration interface 310. In general, memory 212 may be a random access memory (RAM), a non-volatile memory such as a hard disk, an EPROM, or an EEPROM.

Figure 4:
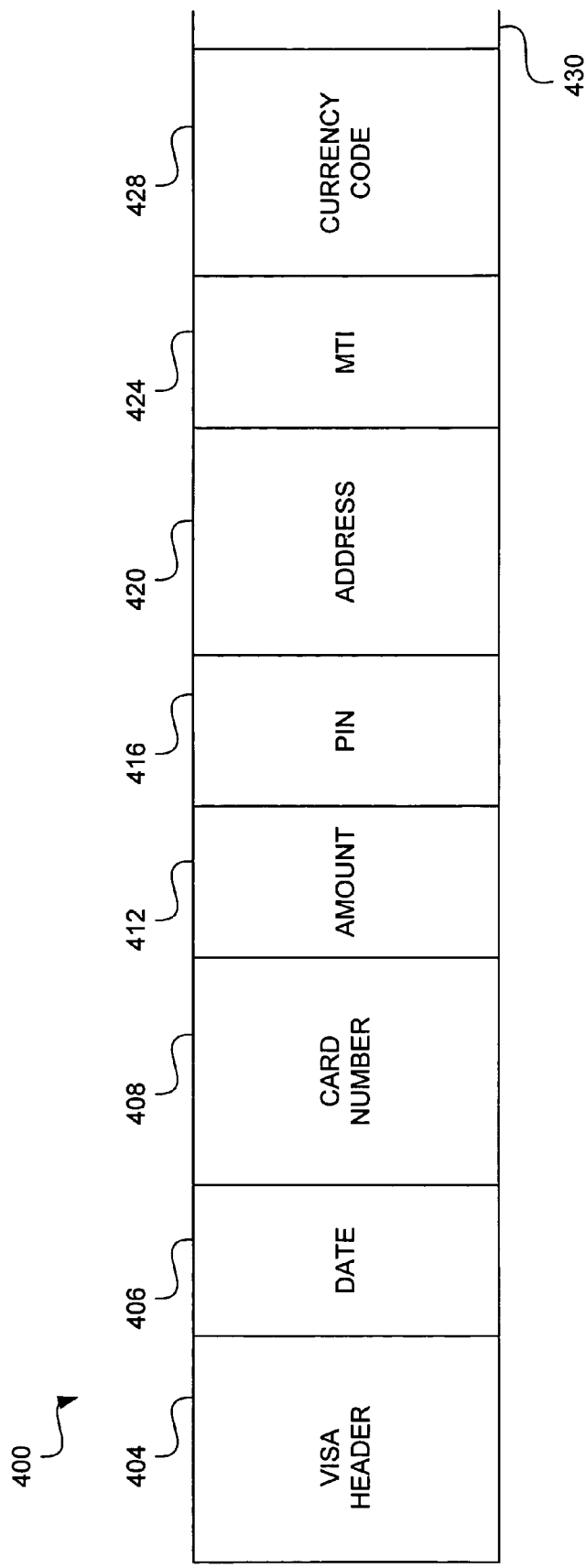
FIG. 4 is a diagrammatic representation of a conventional International Standards Organization (ISO) message for either a credit transaction or a debit transaction.

As mentioned above with respect to FIG. 2, a processing center of a utility provider may generate an ISO 8583-based credit or debit message which is forwarded to a telecommunications network such as VisaNet. Such a message may be used to obtain authorization for a transaction, as-well as to provide a credit or debit account provider with transactional information. FIG. 4 is a diagrammatic representation of a standard ISO credit or debit message. For credit or debit transactions, an ISO 8583 based message is typically used, as will be appreciated by those skilled in the art. A credit or debit ISO message 400 includes a "Visa" header field 404. In the described embodiment, "Visa" header field 404 is a fixed length structure which is "prepended," e.g., attached to the front, of a message. Among other fields, "Visa" header field typically includes a "length" field which holds the length of the message to follow, as well as source and destination identifiers. Using values associated with these fields, each message may be forwarded from a source to a destination and back regardless of the content of a message.

Visa header field 404 includes source and destination identifiers which identify a location which is submitting message 400, and a destination for message 400. The destination is typically the bank which is to be responsible for payment of a charge included in message 400 if the associated transaction is authorized. It should be appreciated that in some embodiments, in lieu of a Visa header field 404, alternate header fields may be included in message 400.

Message 400 also includes a date field 406 which holds bits which specify a date on which a credit or debit transaction has been attempted. A card number field 408 is arranged to hold the credit or debit account number to which an amount in an amount field 412 is to be charged or debited, respectively. In the described embodiment, the amount in amount field 412 may correspond to an amount, e.g., a dollar amount, that is subsequently to be charged or debited for utility consumption. When message 400 is a debit message, a personal identification number (PIN) field 416 is included. PIN field 416 is arranged to hold a PIN that a debit account holder uses in order to authorize a debit transaction from his account. In general, when message 400 is a credit message, PIN field 416 may be eliminated.

An optional address field 420 may contain the address, e.g., the billing address, of the account holder. A message type indicator (MTI) field 424 contains a code which indicates whether message 400 is a credit message or a debit message. In general, when MTI field 424 contains a value of "100," the implication is that message 400 is a credit message. Alternatively, when MTI field contains a value of "200," message 400 is a debit message.

Message 400 also includes a currency code field 428 that contains a code which identifies the currency units of the amount in amount field 412. Currency units may include, but are not limited to, United States dollar units, Canadian dollar units, British pound units, French franc units, and Japanese yen units. By way of example, when the code is "840," then the indication is that the amount in amount field 412 is measured in United States dollars.

In general, various other fields 430 may be included in message 400. Such fields 430 may be arranged, for example, to contain information which may be pertinent to a determination of whether charges in message 400 should be authorized. Such information may include, but is not limited to, a system trace audit number, a merchant's type, and a retrieval reference number.

Figure 5:
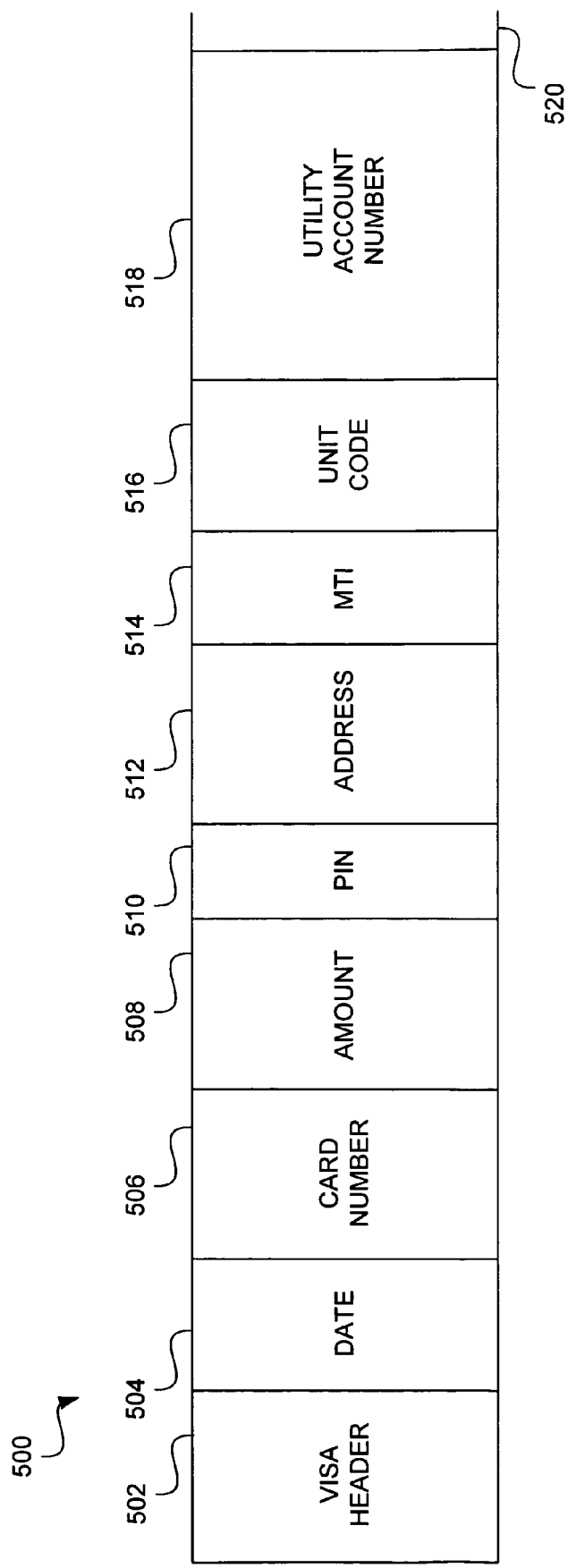
FIG. 5 is a diagrammatic representation of a utility ISO message that is suitable for transmission to a processing center of a utility provider from a smart meter in accordance with an embodiment of the present invention.

As previously mentioned, in order for a processing center of a utility to generate message 400, information relating to an amount to bill, as well as a credit or debit account number, is provided to the processing center in order for message 400 to be created. In the described embodiment, the information is provided to the processing center from a smart meter in the form of a specialized ISO message, i.e., a utility ISO message. FIG. 5 is a diagrammatic representation of one example of a utility message in accordance with an embodiment of the present invention. A utility message 500, like standard credit or debit message 400 of FIG. 4, includes a Visa header field 502, a date field 504, and a card number field 506. Utility message 500 also includes an amount field 508 which, unlike amount field 412 of FIG. 4, may not contain an actual amount to be billed to the card number stored in card number field 506. Instead, the amount stored in amount field 508 is generally an amount that is associated with a unit code stored in unit code field 516. A unit code is indicative of the units associated with a consumed utility. By way of example, when a consumed utility is water, then the unit code may identify gallons as a unit. Alternatively, when a consumed utility is electricity, then the unit code may identify kiloWatt-Hour (KWH) units. The amount stored in amount field 508 is an amount based on the units identified by the unit code, e.g., the amount may be the number of gallons of water used when the unit code identifies gallons. Thus, the amount of the utility consumed by a customer may be transmitted automatically to a utility provider.

An optional PIN field 510 is arranged to hold a PIN when card number field 506 identifies a debit card account number. An address field 512 holds information pertaining to the address of the site at which the smart meter that creates utility message 500 is located. The address information allows a proper utility billing rate to be identified using a utility database such as utility database 208 of FIG. 2. An MTI field 514 is arranged to contain a code that identifies whether utility message 500 is associated with a credit transaction or a debit transaction. Utility message 500 also includes a utility account number field 518 which contains a utility account number. The utility account number is typically a customer's account number with a utility such as an electric company, a gas company, or a water company.

In general, utility message 500 may include additional fields 520. Additional fields 520 may hold information such as a billing address, in the event that the billing address for utility usage differs from the address at which a smart meter is located. Additional fields 520 may also hold bits that identify utility message 500 as containing utility usage information, as opposed to any other type of information. It should be appreciated that in one embodiment, other fields such as MTI field 514, may be arranged to identify utility message 500 as containing utility usage information. Other information such as a system trace audit number or a retrieval reference number may also be included.

Figure 6:
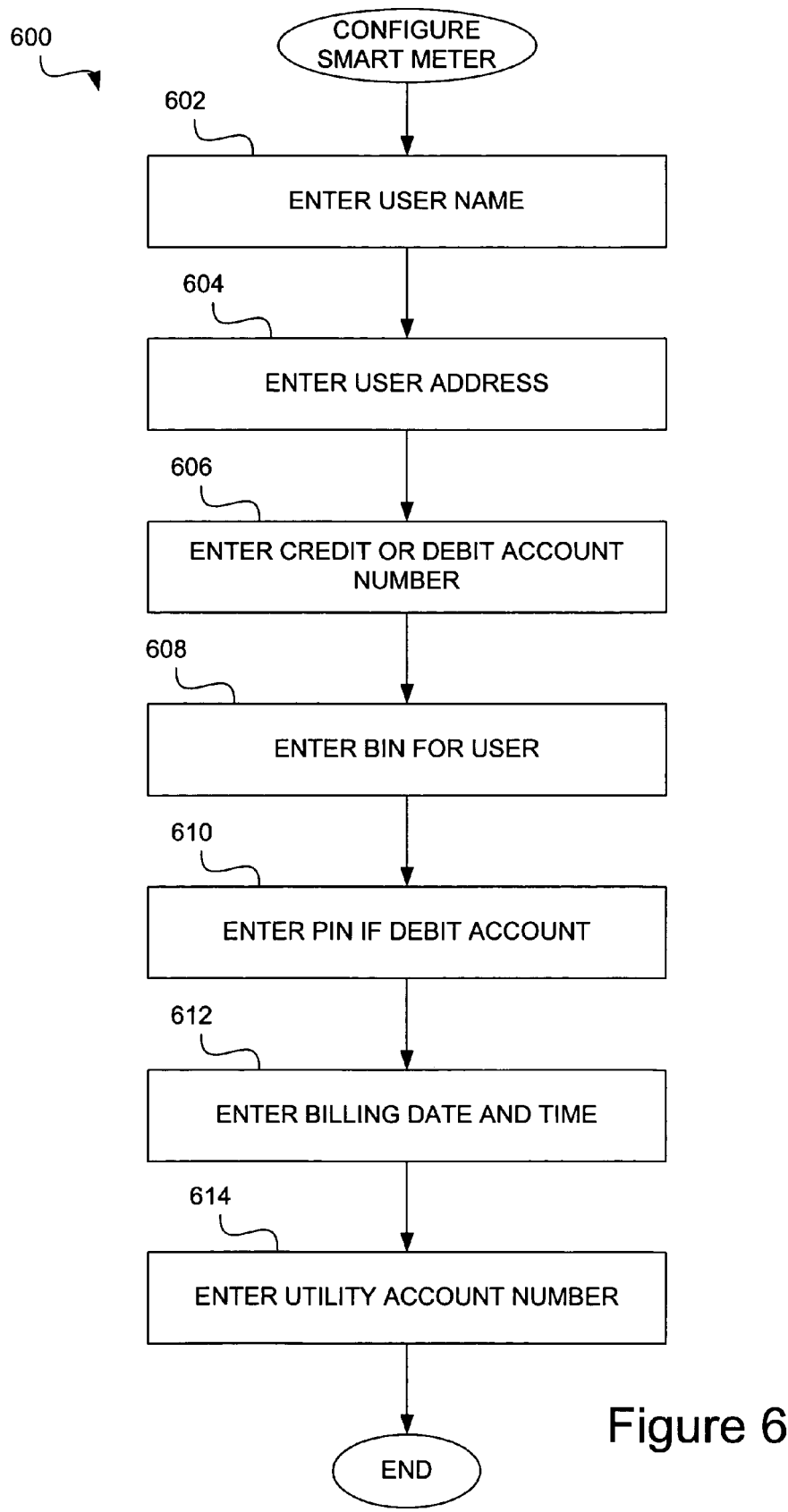
FIG. 6 is a process flow diagram which illustrates the steps associated with configuring a smart meter in accordance with an embodiment of the present invention.

With reference to FIG. 6, the steps associated with configuring a smart meter, i.e., initializing a smart meter such that it is arranged to be used by a particular user, will be described in accordance with an embodiment of the present invention. A smart meter may be configured by a utility provider remotely, e.g., via modem or network interface 308, or locally, e.g., manually via configuration interface 310. The configuration of a smart meter generally occurs when the smart meter is installed and, subsequently, when the responsibility for paying for utility usage is changed. By way of example, a smart meter in a building may be reconfigured when the ownership of the building changes. Preferably, information entered in process 600 is stored in memory 312 of smart meter 202.

A process 600 of configuring a smart meter begins at step 602 in which the name of a user is entered. A user is typically an individual who is responsible for the payment of utility consumption at the site at which a smart meter is located. Entering the name of a user allows a utility provider to associate a user with a particular smart meter. Once the name of the user is entered in step 602, then the address of the user, i.e., the address at which the smart meter is located, is entered 604. A credit or debit account number is then entered in step 606. As will be appreciated by those skilled in the art, when a user chooses to pay for utilities using credit issued by an institution such as a bank, then an appropriate credit account number is entered. Alternatively, when a user chooses to pay for utilities using debit transactions, then a debit account number may be entered.

After the credit or debit account number is entered, then in the described embodiment, a bank identification number (BIN) is entered in step 608 for the user. The BIN that is entered is typically the bank which issued the credit account or the debit account discussed above with respect to step 606. Since a BIN is generally included in a credit account number and a debit account number, e.g., the BIN may be the first six numbers in an account number, in some embodiments, explicitly entering a BIN may be unnecessary. From step 606, process flow moves to step 610 in which a personal identification number (PIN) is entered if the user will be paying for utilities using a debit account.

In step 612, a billing date and time are entered. Entering a billing date and time, e.g., entering a day of a month and a time of day, effectively sets the date and the time at which the smart meter will be read in preparation for billing the user for utility usage. Such a billing date and time may generally reflect the end of a billing cycle. Once the billing date and time are entered, a utility account number is entered in step 614. After the utility account number is input, the process of configuring a smart meter is completed.

Figure 7:
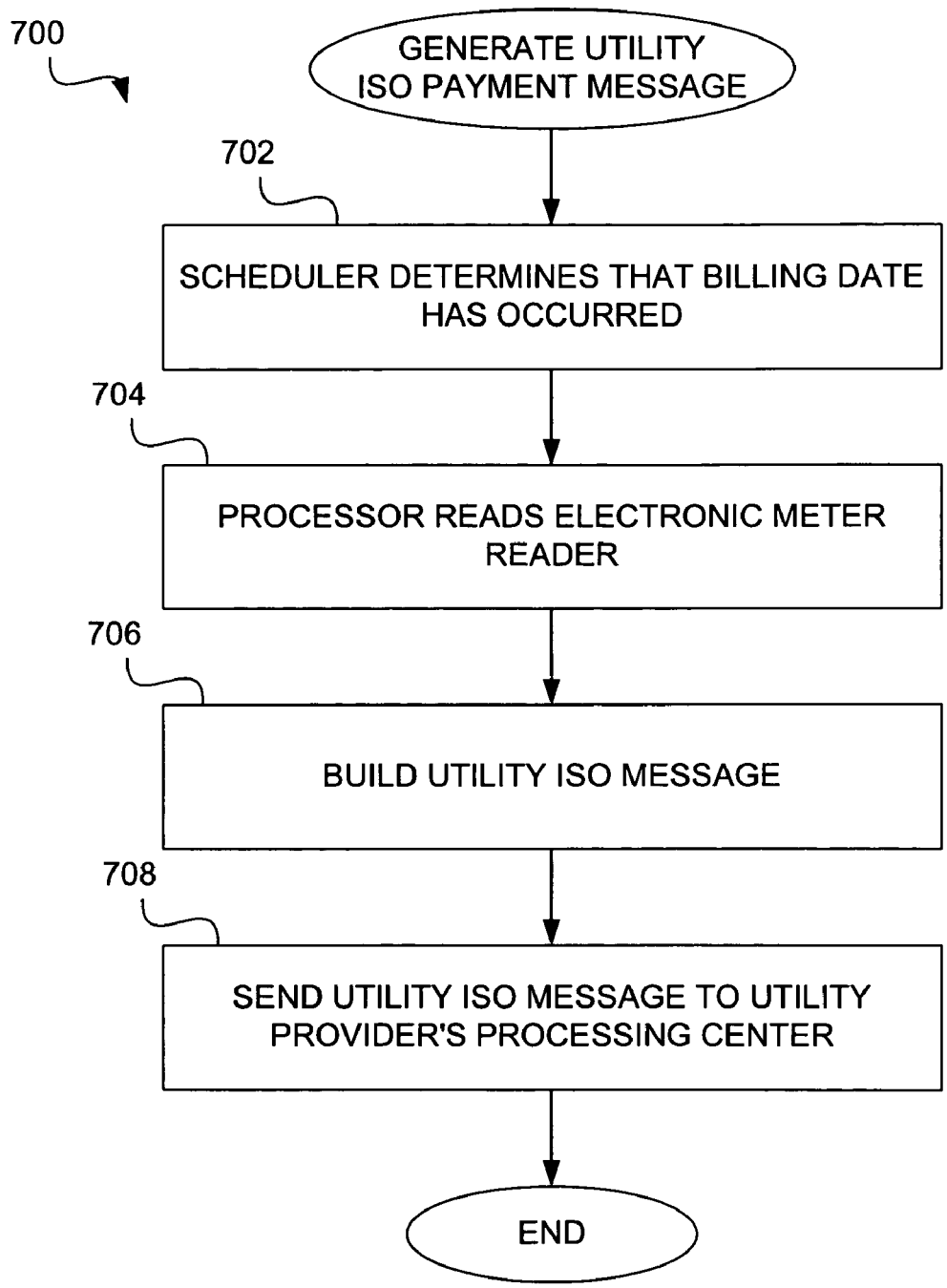
FIG. 7 is a process flow diagram which illustrates the steps associated with generating a utility ISO message in accordance with an embodiment of the present invention.

An ISO payment message which, as previously mentioned, contains a reading from a smart meter, may be generated once the smart meter is configured and a utility has been consumed and should be paid for. FIG. 7 is a process flow diagram which illustrates the steps associated with generating a utility ISO payment message in accordance with an embodiment of the present invention. A process 700 of generating a utility ISO payment message begins at step 702 in which a determination is made that the billing date associated with a smart meter has occurred. Such a determination may be made by a scheduler which is located at a processing center associated with a utility provider. If the scheduler is located at the processing center, then a communications line between the scheduler and the smart meter is first activated before the scheduler may determine if the billing date has occurred by reading the billing date and time from memory 312. Alternatively, such a determination may be made using either software or hardware that is a part of a smart meter, for example, by processor 306, or by configuration interface 310.

If the billing date has occurred, then in step 704, processor 306 queries the smart meter. In the described embodiment, querying the smart meter entails reading electronic meter 304 on the smart meter to obtain a meter, i.e., utility usage, reading. Once the meter reading is obtained, a utility ISO message is generated in step 706 by processor 306. Although the format of the utility ISO message may be widely varied, the format typically includes a calendar date, a unit code, and the meter reading. One example of a suitable utility ISO message was described above with reference to FIG. 5.

In general, the information taken from electronic meter 304 and memory 312 is placed into message 500. By way of example, information may be filled into message 500 "in order." That is, fields may be filled sequentially starting with a first bit location. Alternatively, fields may be filled such that typically static information is filled in first. The static information may include card number 506, PIN 510, address 512, MTI 514, unit code 516, and utility account number 518. "Dynamic" information, e.g., date 504 and amount 508, may be filled into message 500 after static information is provided.

After the utility ISO message is built, the ISO message is sent from the smart meter to the processing center of the utility provider in step 708. In one embodiment, sending the utility ISO message may include initiating a connection between the smart meter and the processing center. Initiating the connection may include, but is not limited to, making a modem connection or activating a network connection. Once the utility ISO message is sent to the processing center, then the process of generating a utility ISO payment message is completed.

Figure 8:
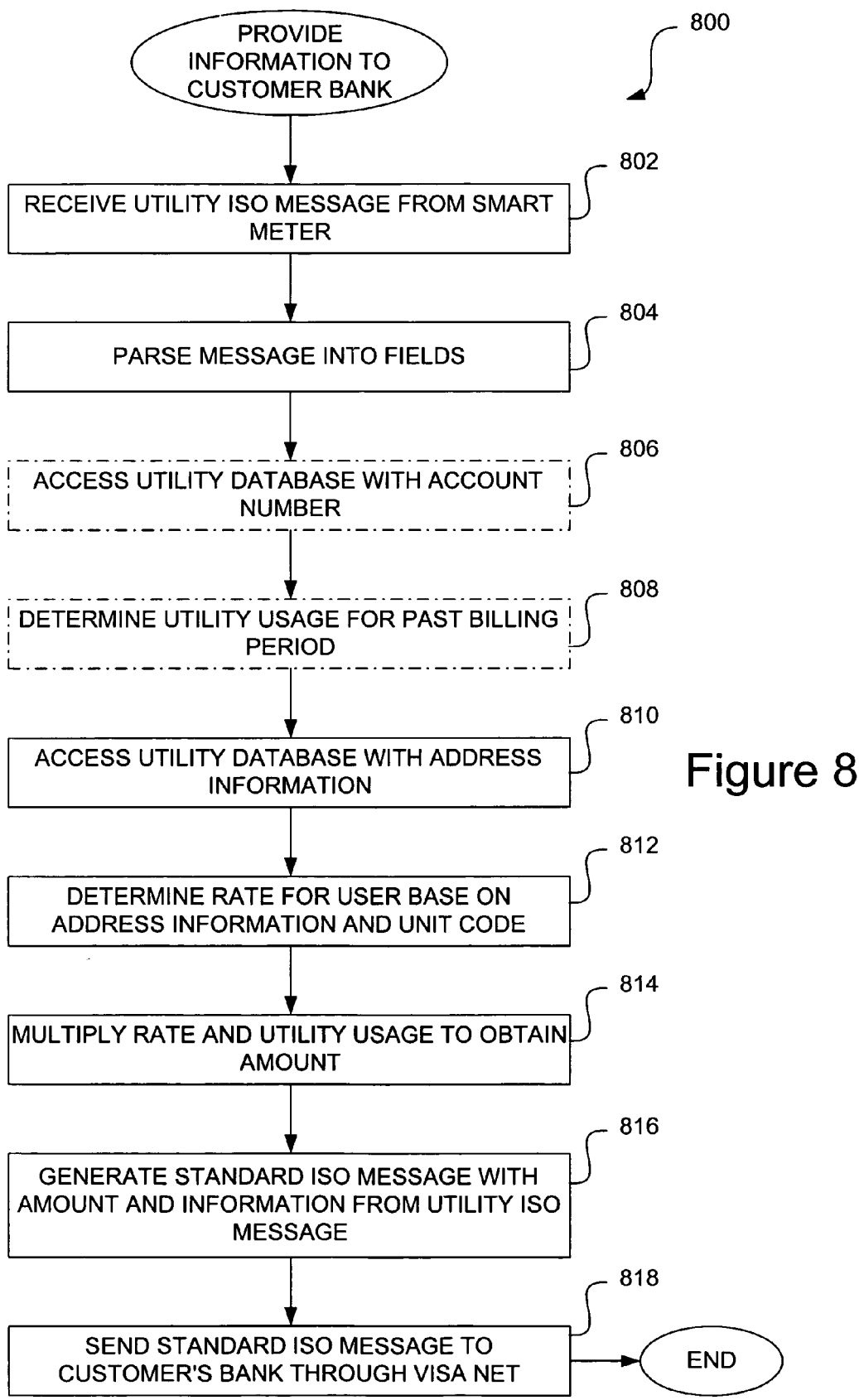
FIG. 8 is a process flow diagram which illustrates the steps associated with providing utility information to the bank of a customer in accordance with an embodiment of the present invention.

Using a utility ISO message, the processing center of a utility may then provide utility information to a customer's bank by generating a standard ISO message that is sent to the bank. A standard ISO message for a credit transaction or a debit transaction was previously described with respect to FIG. 4. Referring next to FIG. 8, one process of providing utility information to a customer's bank will be described in accordance with an embodiment of the present invention. A process 800 of providing information begins when a processing center receives a utility ISO message from a smart meter at step 802. Once received, the utility ISO message is parsed into fields in step 804. Parsing the fields of a utility ISO message typically includes, for example, identifying the bits associated with a credit or debit account number, a utility account number, address information, an amount, and a unit code.

In the described embodiment, the smart meter is a "cumulative" smart meter. That is, the smart meter does not reset itself at the end of a billing period but, instead, maintains a running total of the utility usage at a particular site. Hence, it is necessary to adjust the amount obtained by parsing the corresponding field from the utility ISO message in order to ascertain the "true" amount of utility usage during the billing period which has just ended. Accordingly, in step 806, a utility database, e.g., database 208 of FIG. 2, is accessed using the utility account number obtained when the utility ISO message was parsed. The utility database is arranged to store information relating to the amount read from the smart meter at the end of the previous billing period, or at the last billing date.

Once the utility database is accessed in step 806, the utility usage for the past billing period, i.e., since the last billing date, is determined in step 808. In one embodiment, determining the utility usage since the last billing date involves ascertaining the difference between the amount stored in the utility database from the amount obtained from the utility ISO message.

After the utility usage since the last billing date is determined, the utility database is accessed with address information in step 810. While the address information may be an actual address, as discussed above, the address information may be a code based upon the actual address. Using the address information and a unit code, the rate for the user, or customer, may be determined in step 812. As previously discussed, the rate for a particular utility is typically dependent upon the address of a customer.

The rate is multiplied by the utility usage in step 814 to obtain a billing amount. The billing amount is the amount in currency, e.g., U.S. dollars or Canadian dollars, that is to be billed to the customer's credit account or debit account. Once the billing amount is obtained, then in step 816, the processing center generates a standard ISO message with the billing amount and other information obtained from the utility ISO message. The standard ISO message is transmitted, in step 818, from the processing center to the customer's bank. In the described embodiment, the standard ISO message may be sent to the customer's bank through Visa Net. Upon sending the standard ISO message to the customer's bank, the process of providing information to a customer's bank is completed.

Although only a few embodiments of the present invention have been described, it should be understood that the present invention may be embodied in many other specific forms without departing from the spirit or the scope of the invention. By way of example, a ISO message that is suitable for use as a utility ISO message has been described as including various fields. As will be appreciated by those skilled in the art, the organization of the fields may be widely varied. Additionally, fields may be added and removed in accordance with the particular needs of a given application.

In general, the steps associated with the processes of the present invention may vary. Specifically, the steps of the processes may be reordered, added, removed, and modified without departing from the spirit or the scope of the invention. For instance, the step of entering a BIN for a user's bank may be eliminated and, in one embodiment, replaced by parsing a credit or debit account number to obtain a BIN.

Providing information to a customer's bank, as discussed above, includes accessing a utility database to determine the utility usage for a past billing period. However, for an embodiment in which a reading from a smart meter includes only the amount of utility usage during the past billing period, accessing the utility database for such a purpose may be eliminated. That is, as the smart meter is effectively "reset" at the end of each billing period after a reading is taken, the reading that is taken is indicative of the actual utility usage for the past billing period. Alternatively, when a smart meter is arranged to keep a running total of the utility usage at a particular address, the process of generating a standard ISO message may include storing the smart meter reading in a database. Storing the smart meter reading enables a previous reading to be available for use in determining the actual amount of utility usage during a subsequent billing period.

The generation of a utility ISO payment message has been described to include building an ISO message using a smart meter, and sending the utility ISO payment message to the processing center of a utility provider. It should be appreciated, however, that instead of building a utility ISO payment message using the smart meter, the smart meter may instead transmit information, e.g., a reading from its electronic meter reader, to the processing center where the utility ISO payment message is built.

It should be appreciated that although a utility ISO message has been described as including a utility reading which is obtained using a smart meter, the utility ISO message may also be generated after a utility reading is manually obtained. In other words, the generation of a utility ISO message that may be parlayed into a standard ISO message for a debit transaction or a credit transaction may occur using information which is manually provided. A utility ISO message generated in such a manner may be useful, for example, when it is desired to substantially automatically generate a debit transaction or a credit transaction without benefit of a smart meter.

Although the VisaNet network has been described as being a suitable telecommunications network for use in facilitating communication between a processing center of a utility provider and a bank at which a utility consumer has an account, other telecommunications networks may be suitable for such a use. For instance, the telecommunications networks of Mastercard, American Express, and Discover Card may be suitable for use with the self-paying smart utility metering and payment service of the present invention.

While a smart meter is suitable for use to monitor utility usage, it should be appreciated that the smart meter may be used for purposes other than monitoring water, gas, and electricity usage. By way of example, a smart meter may be used to monitor the usage of solar power. For sites, e.g., homes, that have solar energy producing mechanisms such as solar panels, a smart meter may be coupled to the solar energy producing mechanisms such that a power utility company may purchase excess solar power from the owner of the corresponding site. On a billing date, a reading from the smart meter may be taken to determine the amount of power produced, and in the event that excess power, i.e., more power than may be used at the site, has been produced, the owner's credit account may be credited for the excess power. In other words, a smart meter may be used to facilitate the sale of excess power to a power utility company. Therefore, the present examples are to be considered as illustrative and not restrictive, and the invention is not to be limited to the details given herein, but may be modified within the scope of the appended claims.

What is claimed is:

1. A method for a utility provider to process information relating to usage of a utility, said method comprising:

configuring a smart meter at a remote customer site to include customer address information and a customer card account number;

receiving a utility reading from said smart meter, the utility reading being a measure of the usage of the utility by a customer, wherein the utility reading is received by said utility provider from said remote customer site across a first transmission medium;

receiving, by said utility provider, said address information associated with a location of the smart meter from said smart meter at said remote customer site across said first transmission medium;

receiving, by said utility provider, said customer card account number from said smart meter at said remote customer site across said first transmission medium, wherein said utility reading, said address information and said customer card account number are sent automatically by said smart meter;

determining, by said utility provider, an amount after receiving the utility reading, wherein the amount is determined using the received utility reading and the address information; and automatically transmitting the amount and said customer card account number directly to a financial institution after determining the amount, the amount and said customer card account number being transmitted to the financial institution across a second transmission medium, wherein the financial institution is arranged to automatically effect a payment of the amount by the customer.

2. A method as recited in claim 1 wherein the first transmission medium is one selected from the group consisting of a network communications line, a fiberoptic line, an ISDN line and a telephone line.

3. A method as recited in claim 1 wherein the second transmission medium is one selected from the group consisting of a network communications line, a fiberoptic line, an ISDN line and a telephone line.

4. A method as recited in claim 1 wherein the utility is electricity, water or gas.

5. A method as recited in claim 1 wherein said customer card account number represents a credit card or a debit card.

6. A method as recited in claim 1 further comprising:
transmitting said utility reading, said address information and said customer card account number from said smart meter to said utility in an ISO standard message.

7. A method as recited in claim 1 further including receiving a unit code, the unit code being arranged to identify the units associated with the utility reading.

8. A method as recited in claim 1 wherein transmitting the amount to the financial institution across said second transmission medium includes transmitting the amount across a global telecommunications network, the global telecommunications network being arranged to perform clearance and settlement transactions.

9. A method as recited in claim 8 further including generating a credit message using the amount, wherein transmitting the amount to the financial institution includes transmitting the credit message to the financial institution.

10. A method as recited in claim 8 further including generating a debit message using the amount, wherein transmitting the amount to the financial institution includes transmitting the debit message to the financial institution.

11. A system for processing a utility usage transaction, the system comprising:
- a utility meter located at a remote customer site, the utility meter being arranged to generate a measure of usage of a utility;
- a configuration interface of said utility meter that accepts a customer card account number and a customer address;
- a memory of said utility meter that stores said customer card account number and said customer address;
- a utility provider's processing center arranged to receive automatically the measure of usage, the card account number and the customer address from the utility meter and to calculate a price from the measure of usage and the address, the processing center further being arranged to automatically effect a credit transaction or a debit transaction associated with the price by sending a message to a clearing and settlement system, whereby said utility usage transaction is processed automatically; and
- a communication device of said utility meter arranged to transmit automatically the measure of usage, the card account number and the customer address to the processing center over a telecommunications network.

12. A method as recited in claim 11 wherein the utility is electricity, water or gas.

13. A method as recited in claim 11 wherein said customer card account number represents a credit card or a debit card.

14. A method as recited in claim 11 wherein said message is a standard ISO credit or debit message.

\* \* \* \* \*